(12) United States Patent
Furrer et al.

(10) Patent No.: US 12,217,778 B1
(45) Date of Patent: Feb. 4, 2025

(54) ADJUSTING A SKEW ANGLE AND LATERAL POSITION OF A TAPE HEAD TO REDUCE TRACK PLACEMENT ERRORS

(71) Applicant: INTERNATIONAL BUSINESS MACHINES CORPORATION, Armonk, NY (US)

(72) Inventors: Simeon Furrer, Altdorf (CH); Luzius Kronig, Zürich (CH); Mark Alfred Lantz, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/611,293

(22) Filed: Mar. 20, 2024

(51) Int. Cl.
*G11B 5/588* (2006.01)
(52) U.S. Cl.
CPC ................... *G11B 5/588* (2013.01)
(58) Field of Classification Search
None
See application file for complete search history.

(56) References Cited

U.S. PATENT DOCUMENTS

| | | | |
|---|---|---|---|
| 7,876,521 | B2 | 1/2011 | Cherubini |
| 9,177,571 | B2* | 11/2015 | Cherubini ............ G11B 5/4893 |
| 11,145,323 | B1 | 10/2021 | Bui |
| 11,448,493 | B2 | 9/2022 | Judd |
| 11,688,420 | B2 | 6/2023 | Malina |
| 11,776,569 | B1* | 10/2023 | Biskeborn .......... G11B 5/59688 |
| | | | 360/77.12 |
| 12,051,450 | B1* | 7/2024 | Judd ...................... G11B 5/584 |
| 2004/0212915 | A1* | 10/2004 | Chliwnyj ............... G11B 27/36 |
| 2005/0052778 | A1* | 3/2005 | Bui ........................ G11B 5/584 |
| 2011/0170214 | A1* | 7/2011 | Bui ........................ G11B 15/43 |
| 2015/0332718 | A1* | 11/2015 | Cherubini .......... G11B 5/00813 |
| | | | 360/77.12 |

(Continued)

FOREIGN PATENT DOCUMENTS

GB 2499899 A 9/2013

OTHER PUBLICATIONS

G. Cherubini, et al., "Feedback control of transport systems in tape drives without tension transducers," Elsevier, Mechatronics, vol. 49, Feb. 2018, pp. 211-223.

(Continued)

*Primary Examiner* — Fred Tzeng
(74) *Attorney, Agent, or Firm* — Konrad, Raynes, Davda & Victor LLP; David W. Victor

(57) ABSTRACT

Provided are a tape head controller, tape drive, and method for adjusting a skew angle and lateral position of a tape head to reduce track placement errors. A tape head is rotated at a nominal skew with respect to a tape medium to position servo readers in servo patterns. Data writers are located in a first plane of the tape head and the servo readers are located in a second plane in the tape head. The first and the second planes are separated by a distance. Repeatedly determining a skew angle comprising the nominal skew adjusted by a delta angle, at which to rotate the tape head to position the servo readers in the servo patterns. Repeatedly determining a lateral position error based on the distance and the delta angle. Repeatedly adjusting a lateral position of the tape head using the lateral position error to position the data writers in target data track locations at which to write data.

20 Claims, 8 Drawing Sheets

(56) References Cited

U.S. PATENT DOCUMENTS

2018/0330751 A1* 11/2018 Bui .................. G11B 5/584
2022/0108718 A1   4/2022 Bui
2023/0343363 A1  10/2023 Biskeborn

OTHER PUBLICATIONS

M.A. Lantz, et al., "Servo-Pattern Design ad Track-Following Control for Nanometer Head Positioning on Flexible Tape Media," IEEE, IEEE Transactions on Control Systems Technology, vol. 20, No. 2, Mar. 2012, 13 pp.

* cited by examiner

ADJUSTING A SKEW ANGLE AND LATERAL POSITION OF A TAPE HEAD TO REDUCE TRACK PLACEMENT ERRORS

BACKGROUND OF THE INVENTION

1. Field of the Invention

Provided are a tape head controller, tape drive, and method for adjusting a skew angle and lateral position of a tape head to reduce track placement errors.

2. Description of the Related Art

In magnetic storage systems, data is read from and written onto magnetic recording media utilizing magnetic read and write elements formed on a tape head. Data is written on the magnetic recording media by moving a magnetic recording transducer to a position over the media where the data is to be stored. The magnetic recording transducer generates a magnetic field, which encodes the data into the magnetic media. Data is read from the media by similarly positioning the magnetic read element and then sensing the magnetic field of the magnetic media.

To increase tape capacity, track density needs to be increased, which reduces the track spacing. One of the factors that impedes increasing track linear density is the dimensional stability of the tape. Tape Dimensional Stability (TDS) is a measure of the positional stability of the magnetic data tracks relative to each other and is a function of the tape properties and environmental effects such as temperature, humidity, tension, and creep. These environmental factors cause the tape to expand or contract laterally, across the width of the tape. Therefore, when a tape is written to in one environmental extreme and subsequently read from in another extreme, the position of the data tracks across the tape width can change enough to cause signal degradation or read errors.

Current techniques to reduce TDS from tension variability involve improved transport control with feedback mechanisms to maintain tape tension around constant predetermined values.

SUMMARY

Provided are a tape head controller, tape drive, and method for adjusting a skew angle and lateral position of a tape head to reduce track placement errors. A tape head is rotated at a nominal skew with respect to a tape medium to position servo readers in servo patterns. Data writers are located in a first plane of the tape head and the servo readers are located in a second plane in the tape head. The first and the second planes are separated by a distance. Repeatedly determining a skew angle comprising the nominal skew adjusted by a delta angle, at which to rotate the tape head to position the servo readers in the servo patterns. Repeatedly determining a lateral position error based on the distance and the delta angle. Repeatedly adjusting a lateral position of the tape head using the lateral position error to position the data writers in target data track locations at which to write data.

DETAILED DESCRIPTION

Figure 1:
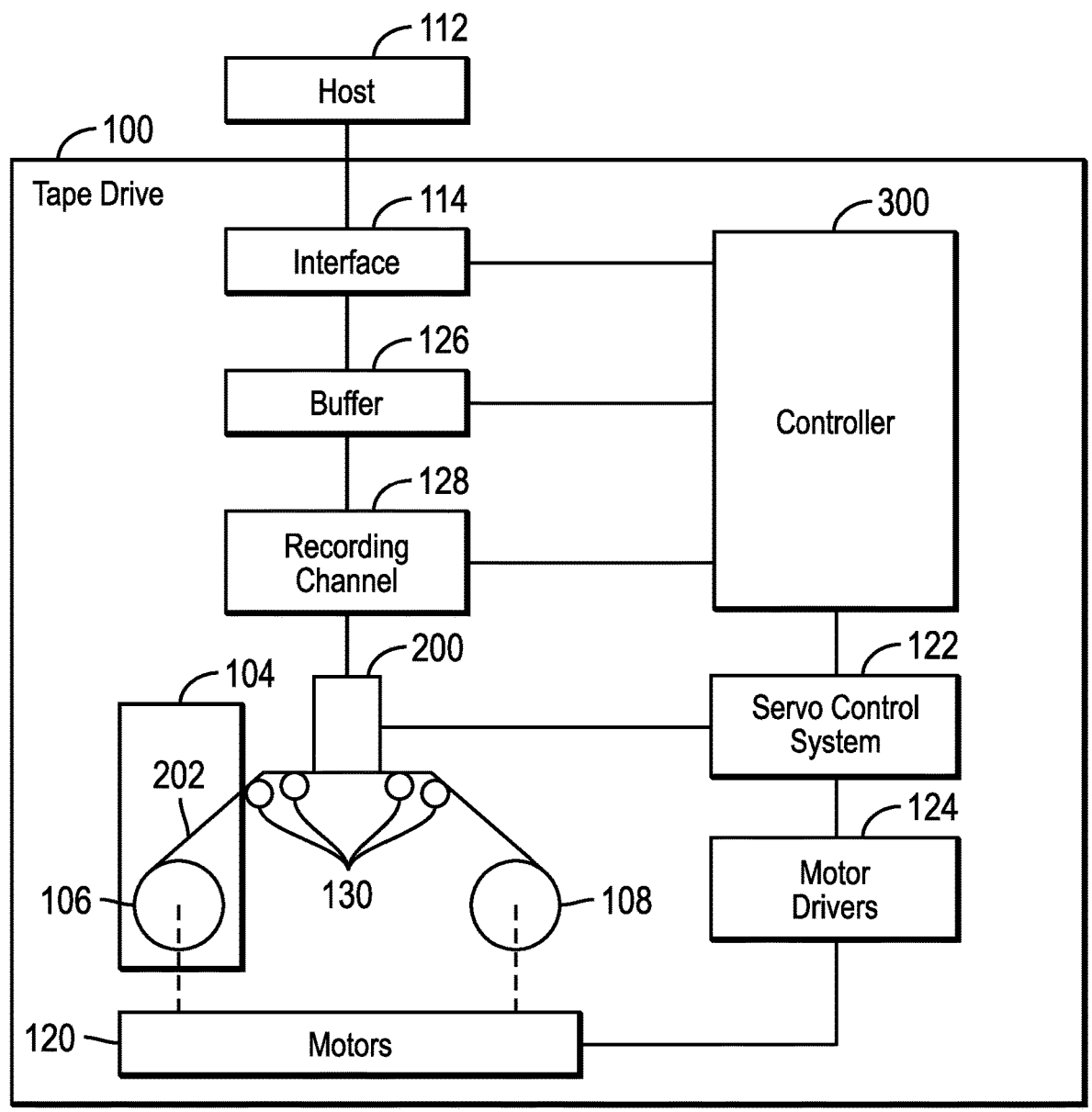
FIG. 1 illustrates an embodiment of a tape drive system in which embodiments are implemented.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description herein provides examples of embodiments of the invention, and variations and substitutions may be made in other embodiments. Several examples will now be provided to further clarify various embodiments of the present disclosure:

Example 1: A tape head controller for controlling a tape head to write to data tracks on a tape medium between servo patterns. The tape head comprises servo readers with a plurality of data writers between the servo readers. The tape head controller rotates the tape head at a nominal skew with respect to the tape medium to position the servo readers in the servo patterns. The data writers are located in a first plane of the tape head and the servo readers are located in a second plane in the tape head. The first and the second planes are separated by a distance. The tape head controller repeatedly determines a skew angle, comprising the nominal skew adjusted by a delta angle, at which to rotate the tape head to position the servo readers in the servo patterns. The tape head controller repeatedly determines a lateral position error based on the distance and the delta angle. The tape head controller repeatedly adjusts a lateral position of the tape head using the lateral position error to position the data writers in target data track locations at which to write data. Thus, embodiments advantageously provide a tape head controller that repeatedly adjusts the tape head to position the servo readers in the servo patterns and additionally adjust the tape head by a lateral position to position data writers in the target data track to take into account the distance between the servo readers and the data writers in separate planes.

Example 2: The subject matter of Examples 1 and 3-9 can optionally include that the determining the skew angle comprises determining the skew angle to eliminate tape width variances in the tape medium measured with the servo patterns. Further, a current is generated to control a skew actuator to rotate the tape head to the skew angle. Thus, embodiments advantageously allow adjustments of the skew angle to eliminate tape with variances in the tape medium.

Example 3: The subject matter of Examples 1, 2, and 4-9 can optionally include that the delta angle is positive in order to position the data writers laterally closer together when a tape width decreases and the delta angle is negative in order to position the data writers laterally further apart when the tape width increases. Thus, embodiments advantageously allow adjustments of the delta angle to position the data writers correctly in the data track to eliminate errors resulting from tape width variances.

Example 4: The subject matter of Examples 1-3 and 5-9 can optionally include that the lateral position of the tape head is adjusted in a negative lateral direction to position the servo readers when the delta angle is positive. Further, the lateral position of the tape head is adjusted in a positive lateral direction to position the servo readers when the delta angle is negative. Thus, embodiments advantageously allow adjustments of the delta angle to position the data writers correctly in the data track to eliminate errors resulting from tape width variances.

Example 5: The subject matter of Examples 1-4 and 6-9 can optionally include that the lateral position error is calculated as from $\sin(\beta\beta)*d/\cos(\beta)$, where $\Delta\beta$ comprises the delta angle, $\beta$ comprises the nominal skew and d comprises the distance. Thus, embodiments advantageously allow calculation of the lateral position from the nominal angle, delta angle, and distance between the planes of the servo readers and the data writers to ensure the data writers are positioned within the data tracks when the skew of the servo readers is adjusted to place them properly in the servo patterns.

Example 6: The subject matter of Examples 1-5 and 7-9 can optionally include a tape dimensional stability (TDS) control system calculates the skew angle and a track-following control system calculates the lateral position error when the tape head is rotated at the skew angle. The track-following control system combines a reference lateral position of the tape head with the lateral position error to produce a position error signal to input to a controller to determine an actuator current. The track-following control system applies the actuator current to the actuator to move the tape head to a lateral position. Thus, embodiments advantageously provide two components to correct for tape width variance errors, a TDS control system to calculate the skew angle to skew the head and a separate track-following control system to determine the lateral position error to correct the data writers' lateral position to place them in the data track to correct for the misplacement of the data writers resulting from the skewing to the tape head to place the servo readers properly in the servo pattern.

Example 7: The subject matter of Examples 1-6, 8, and 9 can optionally include that the TDS control system determines a servo band delta from a lateral distance between the servo readers comprising a measured TDS and feeds back the measured TDS to the TDS control system to recalculate the skew angle. Thus, embodiments advantageously provide for feeding the measured TDS back into the system to continually recalculate the skew angle and lateral position to continually correct for a continually change tape width variance.

Example 8: The subject matter of Examples 1-7 and 9 can optionally include that the skew angle and the lateral position error are repeatedly determined at a fixed clock cycle. Thus, embodiments advantageously provide for continual adjustment of the tape head and lateral position to correct for the continually changing tape width variance by repeating the corrective skew and lateral position at a fixed clock cycle.

Example 9: The subject matter of Examples 1-8 can optionally include that the skew angle and the lateral position error are repeatedly determined when the servo readers reach defined locations in the servo patterns. Thus, embodiments advantageously provide for continual adjustment of the tape head and lateral position to correct for the continually changing tape width variance by repeating the corrective skew and lateral position when the servo readers reach a new location for which further correction of the tape head skew and lateral position may need to be determined due to the new position of the tape head resulting from the servo readers reaching defined locations in the servo patterns.

Example 10 comprises a tape drive including a tape head and a tape head controller of any of Examples 1-9.

Example 11 comprises a method using the tape head controller of Examples 1-9 to correct the tape head position to address tape width variances.

Example 12 comprises a tape library including tape drives having a tape head and a tape head controller of any of Examples 1-9.

Described embodiments provide improvements to tape technology for controlling track placement errors that occur due to head skew angle changes that arise from skew based tape dimensional stability compensation. Tape write heads may include two servo readers and multiple write transducers, referred to as writers, where the writers are in a separate plane from the servo readers. The servo readers estimate the lateral ($\gamma$) position of the head relative to the servo pattern on tape, as well as the head-tape span mismatch, referred to as the TDS error, which is a difference in the servo reader lateral positions measured from the servo patterns. In described embodiments, the lateral position and the skew angle of the head can be dynamically adjusted from a nominal skew angle ($\beta$) and a lateral position reference signal using track-following and skew actuators, where the skew actuator determines a delta angle ($\Delta\beta$) to adjust the skew angle ($\beta$).

However, dynamic skewing $\Delta\beta$ of the writer module around the nominal $\beta$ angle may still result in track-placement errors due to the offset in the plane between the writers and the servo readers. In described embodiments, to achieve the correct/desired data track location to adjust for track-placement errors, the reference lateral head position is adjusted by a lateral position error calculated as a function of the dynamic skew $\Delta\beta$ applied for TDS compensation and a distance between planes having the servo readers and the data writers. For instance, the lateral position error ($\varepsilon_y$) may comprise the $\sin(\Delta\beta)*d/\cos(\beta)$, where "d" is a distance between planes having the servo readers and the data writers.

In this way, the TDS error may be eliminated by adjusting the skew angle of the head and the track placement error can be eliminated by adjusting the lateral position of the tape head to position the data writers on the data tracks. Adjusting the skew angle of the head allows for correction of the TDS error without having to measure and control tape tension through control of the tape reels and motors. Skewing the head, however, leads to a track placement errors which can be corrected by dynamically adjusting the control reference of the track-following control system.

FIG. 1 illustrates an embodiment of a tape drive 100, or tape device, to read and write with respect to a magnetic tape 202 of a magnetic tape cartridge 104. The magnetic tape cartridge 104 comprises a length of magnetic tape 202 wound on one or two reels 106, 108. By way of example, the magnetic tape cartridge 104 may comprise a single reel tape, such as adhering to the Linear Tape Open (LTO) format. An example of a tape drive 100 is the International Business Machines Corporation TS1160 Tape Drive. Other implementations of the tape cartridge 104 and tape drive may also be used, such as LTO type tape drives.

The tape drive 100 may further include one or more controllers 300 to operate the tape drive 100 in accordance with commands received from a host system 112 received at an interface 114. The controller 300 includes logic and/or one or more microprocessors with a memory for storing information and program information for operating the microprocessor(s). The tape drive 100 may comprise a standalone unit or comprise a part of a tape library or other subsystem. The tape drive 100 may be coupled to the host system 112 directly, through a library, or over a network, and employ at interface 114 a Small Computer Systems Interface (SCSI), an optical fiber channel interface, etc.

The tape cartridge 104 may be inserted in the tape drive 100 and loaded by the tape drive 100 mechanisms so that one or more read and/or write elements on a tape head 200 reads and/or writes information in the form of signals with respect to the magnetic tape 202 as the tape is moved longitudinally by one or more motors 120 which rotate the reels 106, 108. Tape guide rollers 130 guide the tape 202 across the tape head 200 to stabilize the positioning of the tape 202 with respect to the head 200 to reduce position error signals (PES). The magnetic tape 202 typically comprises a plurality of parallel tracks, or groups of tracks. In some formats, such as the LTO format, above, the tracks are arranged in a serpentine back and forth pattern of separate wraps.

The recording system may comprise a servo control system 122 to adjust the skew angle of the tape head 200 and/or adjust the position of the head 200 to seek and move the tape head laterally on the tape medium 202, to position the read and write elements at a desired wrap or wraps, and to track-follow the desired wrap or wraps. The tape head 200 can also be skewed relative to the tape medium 202. The servo control system 122 may also control the operation of the motors 120 through motor drivers 124 and in response to instructions from the controller 300.

The controller 300 also provides the data flow and formatter for data to be read from and written to the tape, employing a buffer 126 and a recording channel 128. The controller 300 may comprise program code in a memory device that is loaded into a processor and executed to perform the tape drive operations. Alternatively, some or all of the functions of the controller 300 may be implemented as microcode or firmware in hardware devices in the tape drive 100, such as in Application Specific Integrated Circuits (ASICs). The buffer 126 may comprise a suitable volatile or non-volatile memory device known in the art.

Figure 2A:
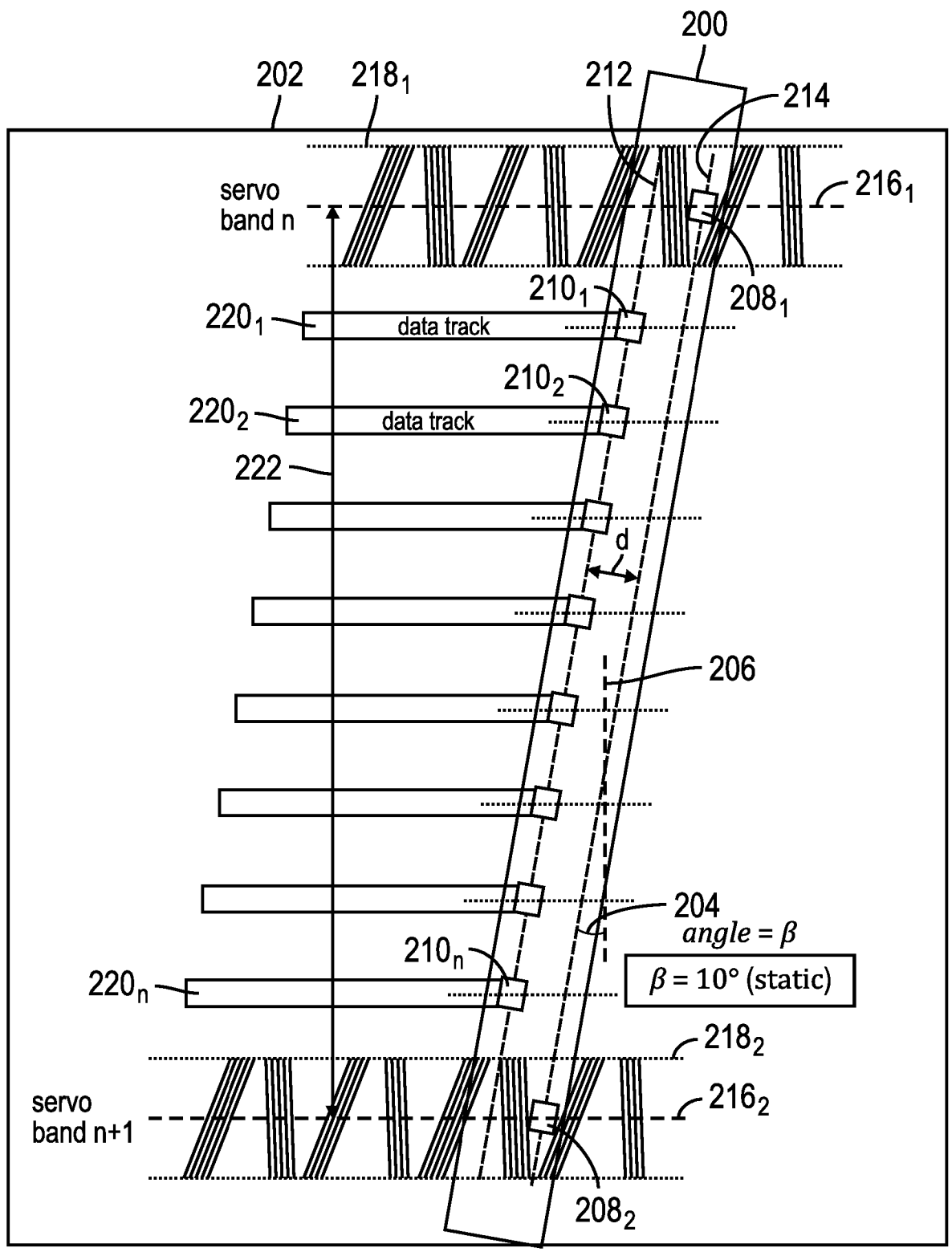
FIGS. 2A, 2B, 2C illustrate embodiments of a tape head positioned at a skew angle to read and write from a tape medium.

FIG. 2A provides an embodiment where the tape head 200, or write module, is designed to be positioned over a tape medium 202 at the nominal skew β 204 with respect to a vertical orientation or vertical axis 206 when there are no errors due to tape dimension errors. Tape dimension errors may result from tension in the tape 202, changes in temperature and humidity, and a storage creep causing dimension changes resulting from being wound on tape rollers. The tape head includes servo readers $208_1$, $208_2$ and a plurality of data writers $210_1$, $210_2$ ... $210_n$. There may be n=32 data writers or fewer or more than 32. As shown in FIG. 2A, the data writers $210_1$, $210_2$ ... $210_n$ lie on a plane 212 parallel to and offset by a distance "d" from a plane 214 on which the servo readers $208_1$, $208_2$ lie. The servo bands $218_1$, $218_2$ have chevron-like patterns or lines written through the servo bands $218_1$, $218_2$ to guide the lateral position of the tape head 200.

FIG. 2A shows the servo band span 222 as the distance between the servo readers $208_1$, $208_2$. The servo readers $208_1$, $208_2$ may be positioned anywhere in the servo band patterns $218_1$, $218_2$ to write at different track locations. FIG. 2A shows, for purposes of illustration, the servo readers $208_1$, $208_2$ located on the servo centerlines $216_1$, $216_2$ of the servo bands $218_1$, $218_2$ in order to write a forward wrap. However, during operations, the servo readers $208_1$, $208_2$ are positioned at different locations in the servo patterns $218_1$, $218_2$ to operate across the full length of tape.

Tape head span is the lateral distance between the two servo writers. Servo band span is the lateral distance between the two servo bands. Servo band delta is the mismatch between servo band span and tape head span and is measured as $YPOS_1-YPOS_2$. The servo band delta is measured as $YPOS_1-YPOS_2$, regardless of where the servo readers $208_1$, $208_2$ are positioned in the servo bands $218_1$, $218_2$, and the difference represents the difference of the actual width to the nominal width. If the tape head span matches the servo band span, $YPOS_1=YPOS_2$ and servo band delta equals zero. If the tape 202 expands relative to the head 200, then $YPOS_1$ will be below their target position in the servo bands $218_1$, $218_2$ (a negative YPOS value) and $YPOS_2$ will be above their target position, resulting in $YPOS_1-YPOS_2$ being a negative number. If the tape 202 contracts relative to the head 200 span, then $YPOS_1-YPOS_2$ is positive. When the head 200 operates at any servo locations, this relation still holds, expansion is a negative servo band delta and contraction is a positive servo band delta.

When the tape 202 is not subject to tape dimension disturbances, the tape head 200 is skewed at an angle β 204 and in a lateral position such that the servo readers $208_1$, $208_2$ are positioned with a defined offset from the centerlines $216_1$, $216_2$, which depends on the wraps which are currently written. Each wrap uses a different servo location. In FIG. 2A, forward wraps are written at servo locations above the servo center line and reverse wraps are written a locations below the center line. In general, the servo location on the center line is not used for writing data.

Depicted in FIG. 2A is a wrap with an offset of 0. The data writers $210_1$, $210_2$, $210_n$ are positioned on data track locations $220_1$, $220_2$ ... $220_n$. This results in the servo band span matching the tape head span. In the initial state at the nominal skew angle, the span or width of the tape head 200, as measured by a vertical distance between the servo readers $208_1$, $208_2$, matches the span or width 222 of the data band, or servo bands. In this initial state, there are no tape width variations. In certain embodiments, when there are no tension disturbances and TDS errors to correct, the nominal tape head skew (β) may be set to 10° and the delta angle (Δβ) or dynamic skew is zero.

Figure 2B:
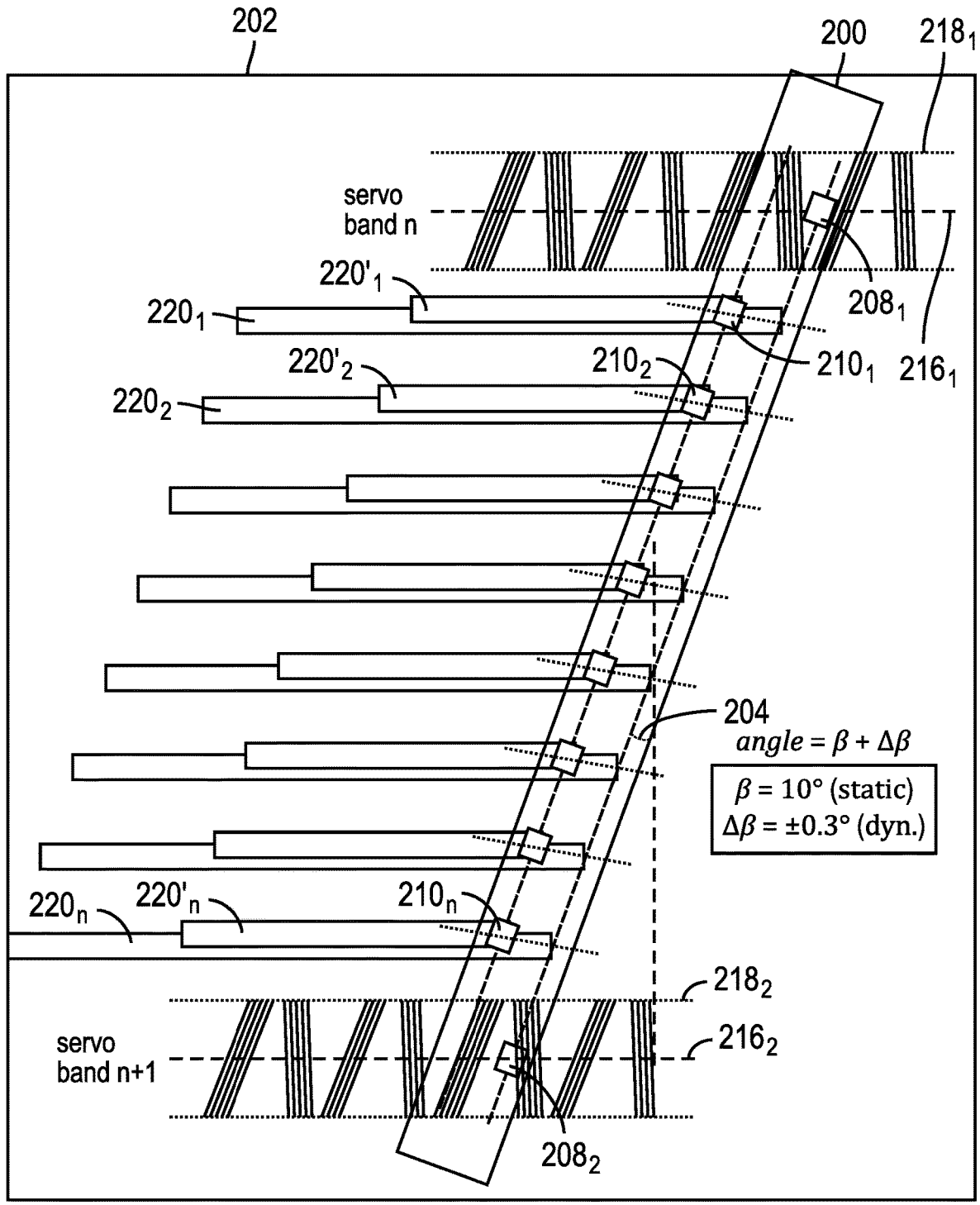

During operations, the tape medium 208 may experience tape width variations, changing the servo band delta, which causes the distance between the tracks and hence the position of the data tracks $220_1$, $220_2$ ... $220_n$ to vary. As shown in FIG. 2B, the servo controller 122 may skew the head 200 by an additional delta angle (Δβ) from the nominal angle (β) to maintain the servo readers $208_1$, $208_2$ positioned at the desired servo band $218_1$, $218_2$ locations to write at the desired track locations $220_1$, $220_2$ ... $220_n$ when the tape width is reduced. However, this change in skew angle results in track placement errors because the data writers $210_1$, $210_2$ ... $210_n$ are no longer positioned in the data track locations $220_1$, $220_2$ ... $220_n$ due to the distance between the plane of the writers and the servo readers and the change in the skew angle.

As shown in FIG. 2B, the data writers $210_1$, $210_2$ ... $212_n$ shift upward from their previous positions, and hence the track locations $220'_1$, $220'_2$ ... $220'_n$ shift up relative to the previous track positions $220_1$, $220_2$ ... $220_n$ due to the change in skew angle by delta angle ($\Delta\beta$) that is applied to correct for an increase in the width of tape due to TDS. As a result, the data writers $210_1$, $210_2$ ... $212_n$ are no longer positioned on the desired track locations $220_1$, $220_2$ ... $220_n$ and hence tracks are written at locations $220'_1$, $220'_2$ ... $220'_n$ which result in track placement errors.

Figure 2C:
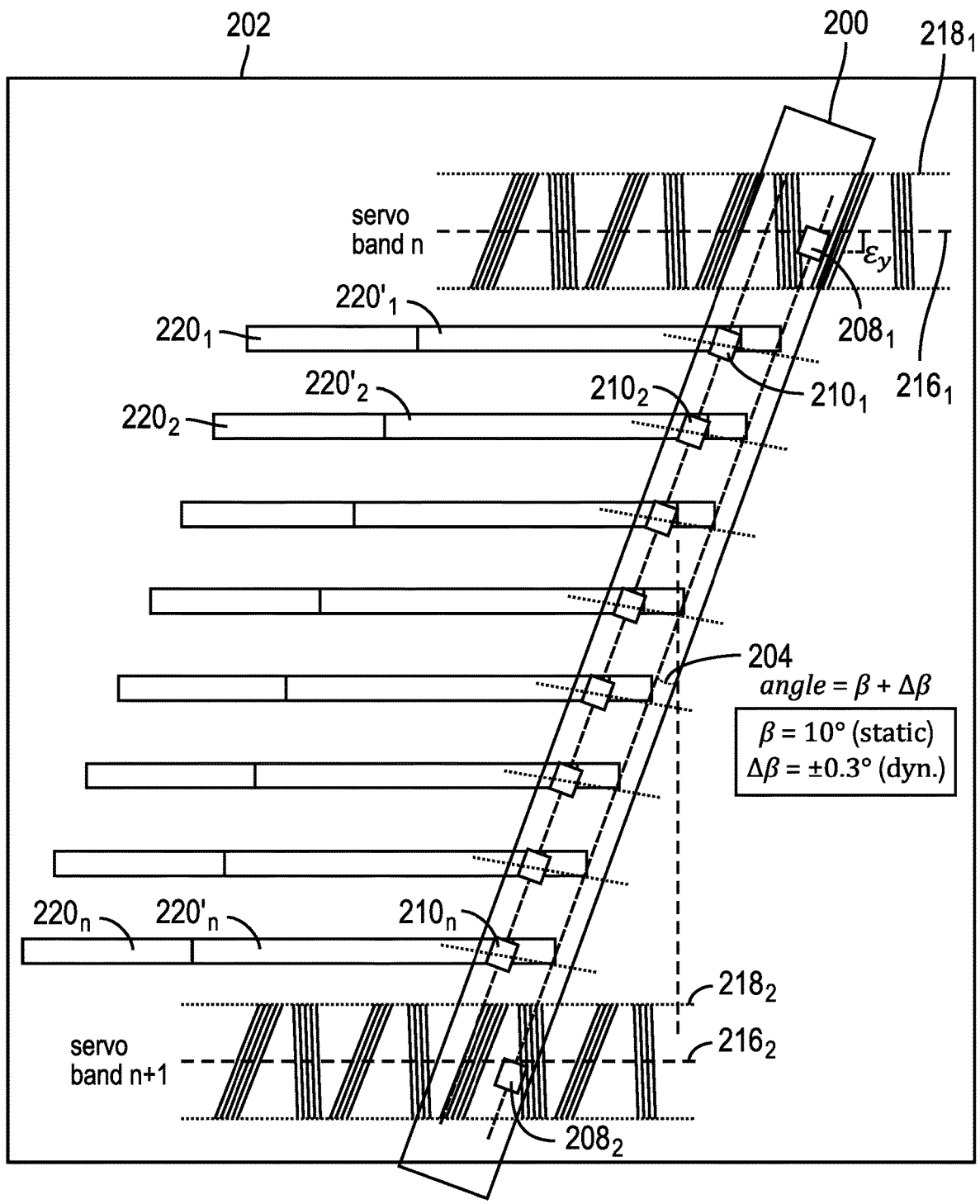

FIG. 2C illustrates how the tape head 200 is shifted upward by a lateral position error $\varepsilon_\gamma$, determined by the controller 300 as described below, to adjust the lateral position of the tape head 200 to align the data writers $210_1$, $210_2$ ... $210_n$ on the data tracks $220'_1$, $220'_2$ ... $220'_n$ to the desired track locations $220_1$, $220_2$ ... $220_n$, where the location where the writers $210_i$ are positioned $220'_1$, $220'_2$ ... $220'_n$ is the same as the desired track locations $220_1$, $220_2$ ... $220_n$.

Figure 3:
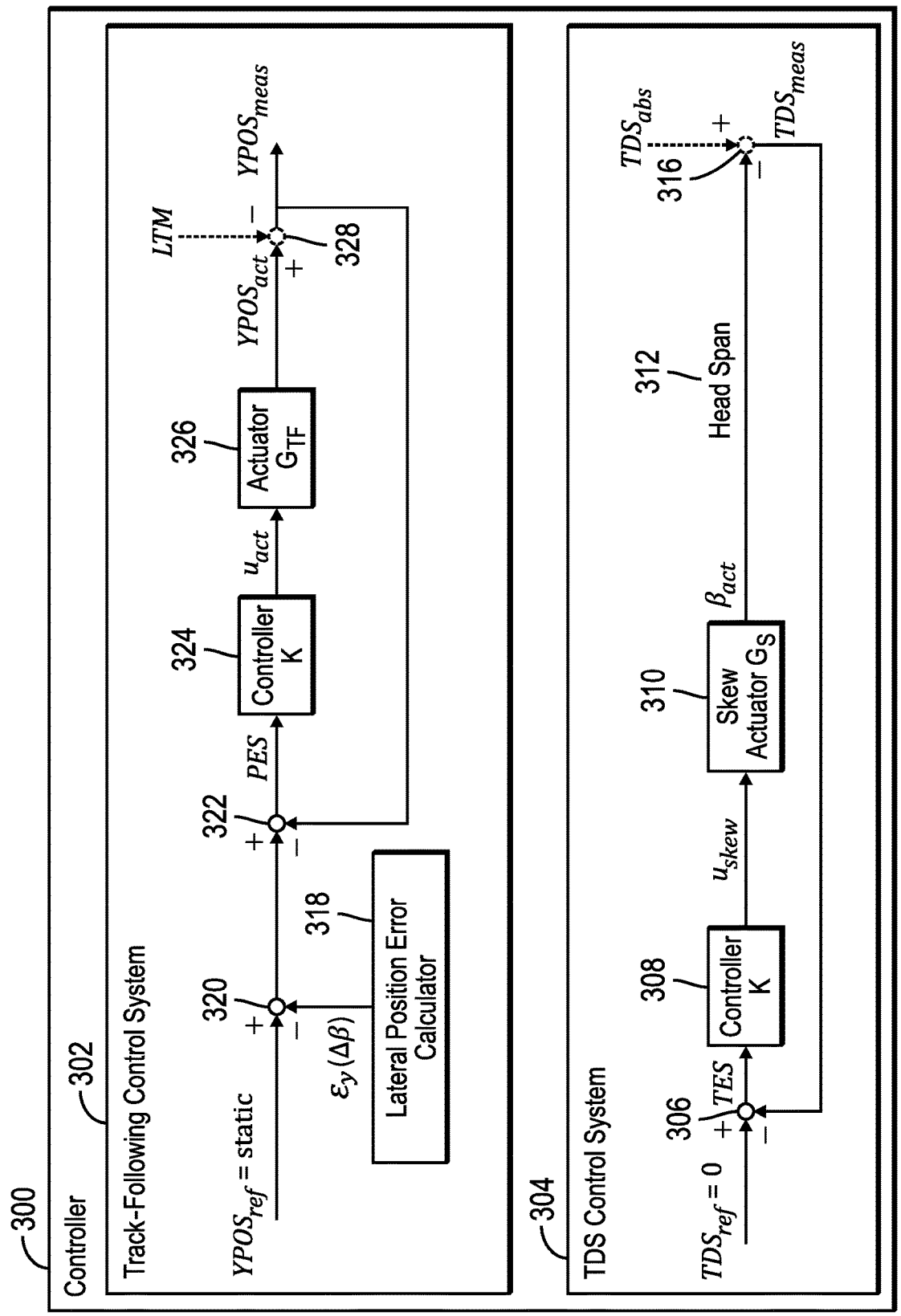
FIG. 3 illustrates an embodiment of a controller having a TDS control system and a track-following control system to control the skew and lateral position of the tape head.

FIG. 3 illustrates a hardware embodiment of the controller 300 as including a track-following control system 302 and a tape dimensional stability (TDS) control system 304. The TDS control system 304 operates to determine a control effect to adjust the nominal skew ($\beta$) by a delta angle ($\Delta\beta$) to remove the effect of TDS errors resulting in contraction or expansion of the tape width, which in turn causes track position errors. The TDS control system 304 includes an adder 306 to combine a TDS reference signal ($TDS_{ref}$) with a negative of a TDS measurement ($TDS_{meas}$), which is initially zero, to produce a TDS error signal (TES) that is inputted to a controller 308 to calculate how much current to apply ($u_{skew}$) to the skew actuator 310 to skew or rotate the tape head 200 to correct for the TES error. If the TES error is not zero then the head 200 is rotated by an actuator angle $\beta_{act}$ comprising nominal skew ($\beta$) adjusted by a delta angle ($\Delta\beta$). Rotating the head 200 by the actuator angle $\beta_{act}$ results in a head span 312, comprising the lateral distance between the two servo readers $208_1$, $208_2$, which is determined by reading the servo patterns. The head span 312 reflects physical effects of $TDS_{abs}$ of TDS disturbances resulting from tension, temperature, humidity, creep, etc., that are incorporated into the signal, as represented by adder 316. Adder 316 is a conceptual representation, not a physical adder, that represents conceptually how such TDS disturbances affect the TDS value realized by $TDS_{meas}$, which is fed back to adder 306 to perform another iteration of calculating the skew angle at which to skew the tape head 200.

The track-following control system 302 includes a lateral position error calculator 318 to calculate a lateral position error $\varepsilon_\gamma$ ($\Delta\beta$), calculated from $\sin(\Delta\beta)*d/\cos(\beta)$, where d is the distance shown in FIG. 2A between the planes 212 and 214 having the data writers $210_1$ ... $210_n$ and the servo readers $208_1$, $208_2$, respectively. The track-following control system 302 may determine the delta angle ($\Delta\beta$) from the servo pattern which is inputted to the lateral position error calculator 318. An adder 320 adds a lateral position reference signal ($YPOS_{ref}$), which may comprise the lateral position to place the servo readers $208_1$, $208_2$ when there is no TDS, with a negative of the lateral position error $\varepsilon_\gamma$ ($\Delta\beta$). Adder 322 adds the output of adder 320 with a negative of the feedback of a measured lateral position $YPOS_{meas}$ to produce a position error signal (PES) inputted to controller 324. The controller 324 outputs an actuator current ($u_{act}$) to control the actuator 326 to move the head 200 to a lateral position $YPOS_{act}$. $YPOS_{meas}$ is a lateral position error and is defined as the difference between $YPOS_{\_act}$ and lateral position displacements due to LTM. $YPOS_{meas}$ may be calculated as $0.5*(YPOS_1+YPOS_2)$. Adder 328 is a conceptual representation, not a physical adder, that represents conceptually how such LTM affects the lateral error represented by $TDS_{meas}$, which is fed back to adder 306 to perform another iteration of calculating the skew angle at which to skew the tape head 200.

The measured lateral position $YPOS_{meas}$ is further fed back to adder 322 to perform another iteration of moving the head with the next received lateral position error $\varepsilon_\gamma$ ($\Delta\beta$). In this way, changes in the TDS cause the TDS control system 304 to skew the tape head nominal angle ($\beta$) by a delta angle ($\Delta\beta$) to skew the tape head 200 to compensate for TDS. The track-following control system 302 calculates this delta angle ($\Delta\beta$) to determine a lateral position error $\varepsilon_\gamma$ ($\Delta\beta$) by which to adjust the lateral position of the tape head 200 to eliminate track position errors.

The controller 300 compensates for a lateral position error resulting from tape dimension errors that causes the data tracks to be misaligned with the data writers without having to control the tape reels 106, 108 to increase or reduce tension in the tape 202.

Figure 4:
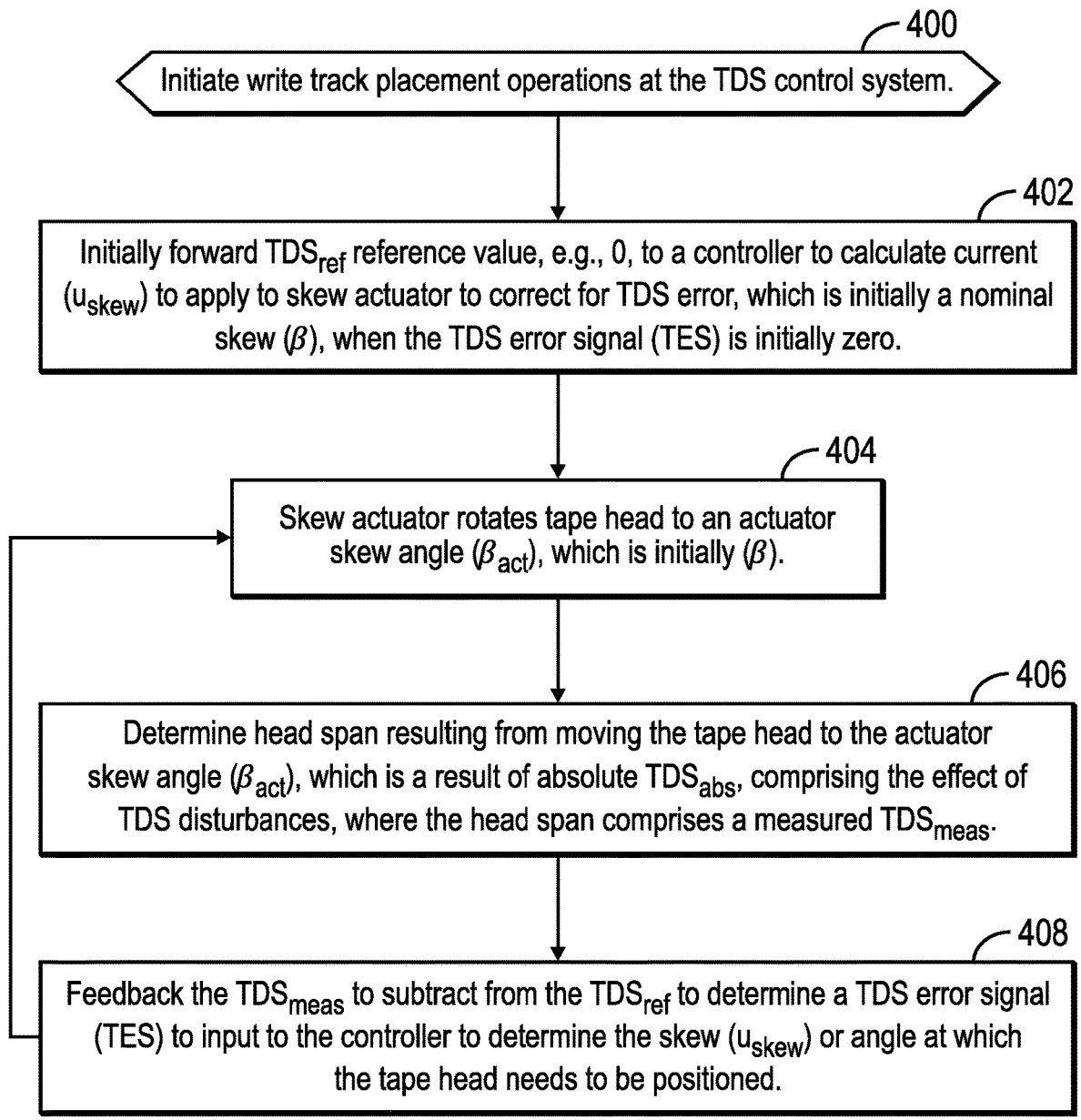
FIG. 4 illustrates an embodiment of operations to determine a skew angle of the tape head to minimize TDS errors.

FIG. 4 illustrates an embodiment of operations for TDS control system 304 to initiate track placement operations to compensate for tension variations. Upon initiating (at block 400) track placement operations, the TDS reference value $TDS_{ref}$ is forwarded (at block 402) to the controller 308 to calculate a current ($u_{skew}$), which is a nominal skew ($\beta$) when the TDS error signal (TES) is initially zero, to apply to the skew actuator 310 to rotate (at block 404) the tape head to a skew angle ($\beta_{act}$) at which to position the tape head 200, which is initially ($\beta$). A head span 312 is determined (at block 406) resulting from moving the tape head to the actuator skew angle ($\beta_{act}$), which incorporates TDS disturbances $TDS_{abs}$, included in the measurement of the head span 312. The measured $TDS_{meas}$ is fed back (at block 408) to the adder 306 to subtract from the $TDS_{ref}$ to determine an updated TDS error signal (TES) and control returns to block 404 to input to determine a new delta angle ($\Delta\beta$) and $TDS_{skew}$.

With the embodiment of FIG. 4, the $TDS_{meas}$ is a measurement of a mismatch of the servo band span 222, or lateral distance between the two servo bands, and the span of the head 200, which is measured as $YPOS_1-YPOS_2$. The head 200 is adjusted by continually changing delta angle ($\Delta\beta$) to change the skew to accommodate for the $TDS_{abs}$. The TDS control system 304 is constantly adjusting the skew actuator angle ($\beta_{act}$) at which to skew the tape head 200 to adjust for TDS disturbances due to tension variations in the tape. The delta angle ($\Delta\beta$) is positive if the tension increases to contract the width of the tape 202 and move the data tracks together and negative if the tension sufficiently decreases to expand the width of the tape 202 and move the data tracks apart. The delta angle ($\Delta\beta$) changes to alter the lateral distance between the servo readers to match the distance between the servo bands, which changes as the width of the tape 202 changes due to tension variations. The track-following control system 302 additionally adjusts the lateral position of the head 200 while skewed to have the data writers positioned in the data tracks, whose position changes as a result of tension variations.

Figure 5:
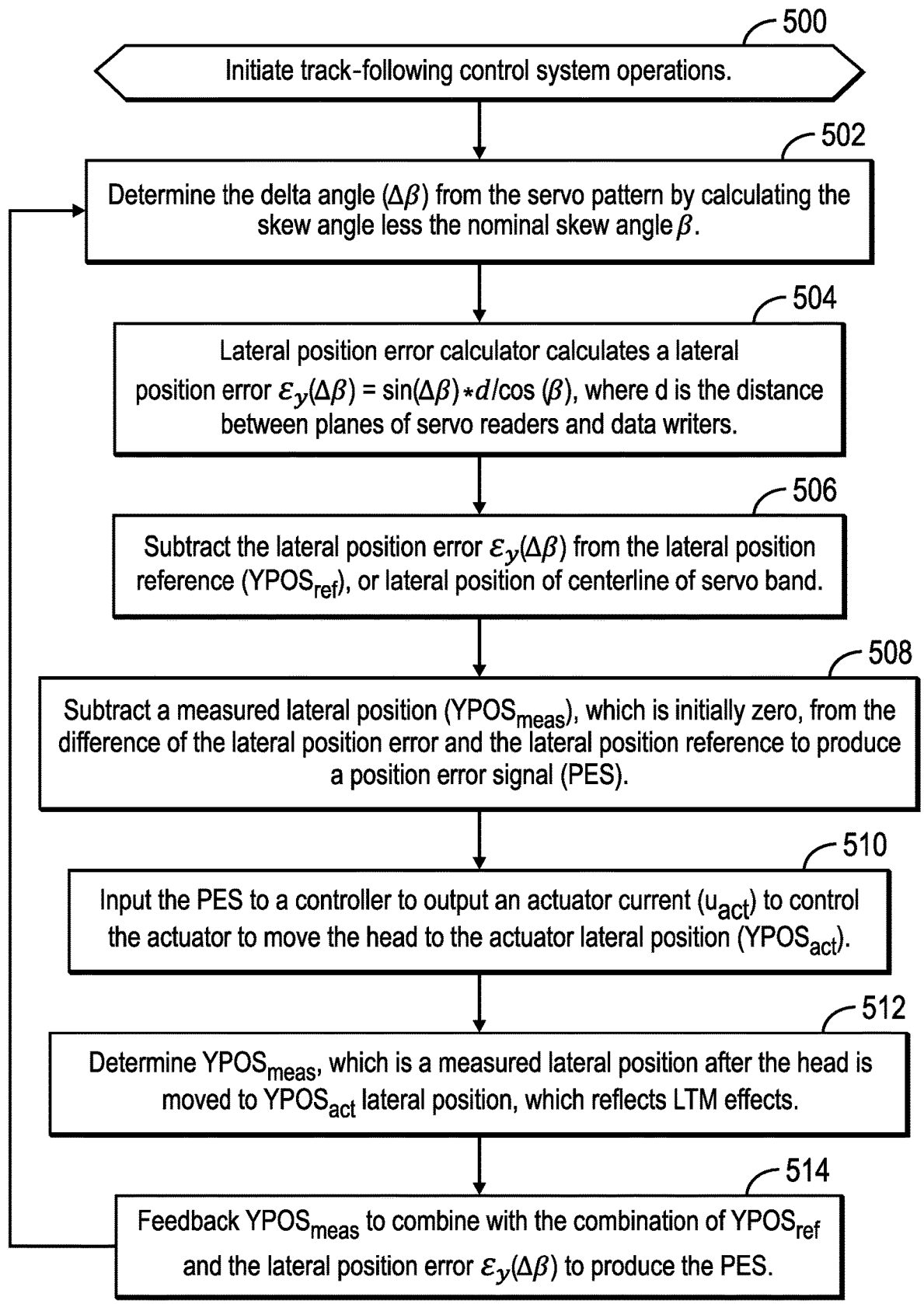
FIG. 5 illustrates an embodiment of operations to determine a lateral position error to adjust the lateral position of the tape head to reduce track position errors.

FIG. 5 illustrates an embodiment of operations performed by the track-following control system 302 to adjust for lateral position errors resulting from the delta angle ($\Delta\beta$) altering the skew from a nominal skew ($\beta$) and the writers $210_i$ positioned at an offset from the servo readers $208_i$. The track-following control system 302 initiates (at block 500) operations to adjust the lateral position based on errors resulting from the TDS control system 304 rotating the head 200. The lateral position error calculator 318 determines (at block 502) the delta angle ($\Delta\beta$) from the servo pattern by calculating the skew angle less the nominal skew angle $\beta$. The lateral position error calculator 318 calculates (at block 504) a lateral position error $\varepsilon_\gamma(\Delta\beta)=\sin(\Delta\beta)*d/\cos(\beta)$, where d is the distance between planes of servo readers and data writers, as shown in FIG. 2A. The adder 320 subtracts (at block 506) the lateral position error $\varepsilon_\gamma(\Delta\beta)$ from the lateral position reference ($YPOS_{ref}$), which may comprise the lateral position of the centerline $216_1$ of the servo band $218_1$. Adder 322 subtracts (at block 508) a measured lateral position ($YPOS_{meas}$), which is initially zero, from the output from adder 320 to produce a position error signal (PES), or placement error of the data writers $210_i$ on the data tracks. The PES is inputted (at block 510) to a controller 324 to output an actuator current ($u_{act}$) to control the actuator 326 to move the head to an actuator lateral position ($YPOS_{act}$).

A $YPOS_{meas}$ is determined (at block 512), which is a measured lateral position after the head 200 is moved to $YPOS_{act}$ lateral position, which reflects LTM effects. In one embodiment, the $YPOS_{meas}$ may be calculated as $0.5*(YPOS_1+YPOS_2)$, which is a lateral position error and defined as the difference between $YPOS_{act}$ and lateral position displacements due to LTM. The $YPOS_{meas}$, or position error PES, is fed back (at block 514) to the adder 322 to combine with the combination of $YPOS_{ref}$ and a newly calculated lateral position error $\varepsilon_\gamma(\Delta\beta)$ to produce an adjusted PES. Control then proceeds back to block 502 to use the PES to further adjust the tape head 200 in the lateral position.

With the embodiment of FIG. 5, track-following control system 302, after the tape head is skewed to match the width of the tape, further adjusts the lateral position of the head to position the data writers within the data tracks, whose position may have become misaligned as a result in changes to the span of the tape from tension vibrations.

The operations of FIGS. 4 and 5 of the TDS control system 304 and track-following control system 302 are repeatedly performed during tape head operations to continually adjust the tape head 200 for tape dimension errors. The operations of FIGS. 4 and 5 may be triggered at a fixed clock interval, such as 50 microseconds. Alternatively, the adjustments of FIGS. 4 and 5 may be performed each time the servo readers $208_1$, $208_2$ move to a new subframe of servo patterns in the servo bands $218_1$, $218_2$. In this way, the adjustments are repeatedly performed during tape head operations.

Figure 6:
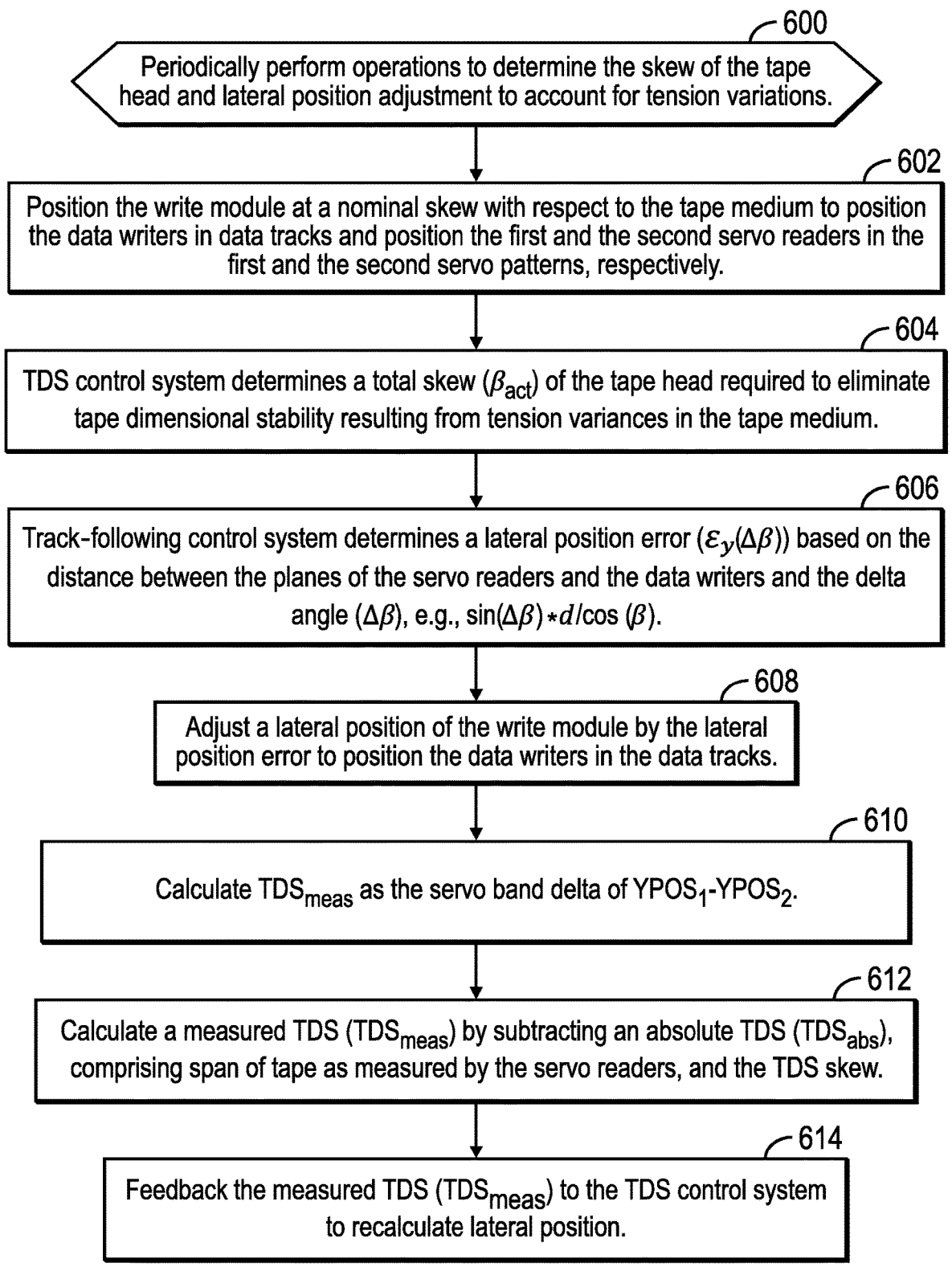
FIG. 6 an embodiment of operations to determine a tape head skew and lateral position error adjustment to the lateral position of the tape head to reduce TDS errors.

FIG. 6 illustrates an embodiment of operations performed in the controller 300 or other components to determine the tape head skew and lateral position corrections to adjust for track positioning errors due to tape dimension stability effects. Upon periodically initiating (at block 600) operations to determine the skew of the tape head 200 and the lateral position adjustment to eliminate the effects of TDS, the controller 300 positions (at block 602) the write module/head 200 at a nominal skew with respect to the tape medium 202 to position the data writers $210_1 \ldots 210_n$ in the data tracks $220_1 \ldots 220_n$ and position the first and the second servo readers $208_1$, $208_2$ in the servo bands $218_1$, $218_2$. In this initial position, there are no TDS effects. The controller 300 determines (at block 604) a total skew ($\beta_{act}$) of the tape head 200 required to eliminate tape dimensional stability errors resulting from tension variances in the tape medium 202. The total skew is the amount the tape head needs to be skewed to have the lateral length of the tape head match that of the servo band span.

The track-following control system 302 may then determine (at block 606) a lateral position error ($\varepsilon\gamma(\Delta\beta)$) based on the distance "d" between the planes of the servo readers and the data writers and the delta angle ($\Delta\beta$), e.g., $\sin(\Delta\beta)*d/\cos(\beta)$. The lateral position of the write module is adjusted (at block 608) by the lateral position error to position the data writers in the data tracks.

The TDS control system 304 calculates (at block 610) a servo band delta as $YPOS_1-YPOS_2$, which is the mismatch between servo band span 222 and head span. The servo band delta comprises the measured $TDS_{meas}$. The measured $TDS_{meas}$ is fed back (at block 614) to the TDS control system 304 to recalculate the delta angle ($\Delta\beta$), which results in the track-following control system 302 recalculating the lateral position error to determine lateral position adjustments to eliminate the effects of LTM.

In the described embodiment, variables i, n, etc., when used with different elements may denote a same or different instance of that element or different number of elements.

Terms such as "top", bottom", "left", "right" and the like may be used for descriptive purposes only and are not to be construed as limiting. Embodiments may be manufactured, used, and contained in a variety of positions and orientations.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A tape head controller for controlling a tape head to write to data tracks on a tape medium between servo patterns, wherein the tape head comprises servo readers with a plurality of data writers between the servo readers, wherein the tape head controller performs operations, the operations comprising:
    rotating the tape head at a nominal skew with respect to the tape medium to position the servo readers in the servo patterns, wherein the data writers are located in a first plane of the tape head and the servo readers are located in a second plane in the tape head, wherein the first and the second planes are separated by a distance;
    repeatedly determining a skew angle, comprising the nominal skew adjusted by a delta angle, at which to rotate the tape head to position the servo readers in the servo patterns;
    repeatedly determining a lateral position error based on the distance and the delta angle; and
    repeatedly adjusting a lateral position of the tape head using the lateral position error to position the data writers in target data track locations at which to write data.

2. The tape head controller of claim 1, wherein the determining the skew angle comprises:
    determining the skew angle to eliminate tape width variances in the tape medium measured with the servo patterns; and
    generating a current to control a skew actuator to rotate the tape head to the skew angle.

3. The tape head controller of claim 1, wherein the delta angle is positive in order to position the data writers laterally closer together when a tape width decreases and wherein the delta angle is negative in order to position the data writers laterally further apart when the tape width increases.

4. The tape head controller of claim 1, wherein the lateral position of the tape head is adjusted in a negative lateral direction to position the servo readers when the delta angle is positive, and wherein the lateral position of the tape head is adjusted in a positive lateral direction to position the servo readers when the delta angle is negative.

5. The tape head controller of claim 1, wherein the lateral position error is calculated as $\sin(\Delta\beta)*d/\cos(\beta)$, where $\Delta\beta$ comprises the delta angle, $\beta$ comprises the nominal skew and d comprises the distance.

6. The tape head controller of claim 1, wherein a tape dimensional stability (TDS) control system calculates the skew angle and a track-following control system calculates the lateral position error when the tape head is rotated at the skew angle, wherein the track-following control system performs:
    combining a reference lateral position of the tape head with the lateral position error to produce a position error signal to input to a controller to determine an actuator current; and
    applying the actuator current to the actuator to move the tape head to a lateral position.

7. The tape head controller of claim 6, wherein the TDS control system further performs:
    determining a servo band delta from a lateral distance between the servo readers comprising a measured TDS; and
    feeding back the measured TDS to the TDS control system to recalculate the skew angle.

8. The tape head controller of claim 1, wherein the skew angle and the lateral position error are repeatedly determined at a fixed clock cycle.

9. The tape head controller of claim 1, wherein the skew angle and the lateral position error are repeatedly determined when the servo readers reach defined locations in the servo patterns.

10. A tape drive to read and write to a tape medium, comprising:
    a tape head having servo readers and a plurality of data writers between the servo readers; and
    a tape head controller for controlling the tape head to write to data tracks on the tape medium between servo patterns, wherein the tape head controller performs operations, the operations comprising:
        rotating the tape head at a nominal skew with respect to the tape medium to position the servo readers in the servo patterns, wherein the data writers are located in a first plane of the tape head and the servo readers are located in a second plane in the tape head, wherein the first and the second planes are separated by a distance;
        repeatedly determining a skew angle, comprising the nominal skew adjusted by a delta angle, at which to rotate the tape head to position the servo readers in the servo patterns;
        repeatedly determining a lateral position error based on the distance and the delta angle; and
        repeatedly adjusting a lateral position of the tape head using the lateral position error to position the data writers in target data track locations at which to write data.

11. The tape drive of claim 10, wherein the determining the skew angle comprises:
    determining the skew angle to eliminate tape width variances in the tape medium measured with the servo patterns; and
    generating a current to control a skew actuator to rotate the tape head to the skew angle.

12. The tape drive of claim 10, wherein the lateral position of the tape head is adjusted in a negative lateral direction to position the servo readers when the delta angle is positive, and wherein the lateral position of the tape head is adjusted in a positive lateral direction to position the servo readers when the delta angle is negative.

13. The tape drive of claim 10, wherein a tape dimensional stability (TDS) control system calculates the skew angle and a track-following control system calculates the lateral position error when the tape head is rotated at the skew angle, wherein the track-following control system performs:

combining a reference lateral position of the tape head with the lateral position error to produce a position error signal to input to a controller to determine an actuator current; and applying the actuator current to the actuator to move the tape head to a lateral position.

14. The tape drive of claim 13, wherein the TDS control system further performs:

determining a servo band delta from a lateral distance between the servo readers comprising a measured TDS; and feeding back the measured TDS to the TDS control system to recalculate the skew angle.

15. The tape drive of claim 10, wherein the skew angle and the lateral position error are repeatedly determined when the servo readers reach defined locations in the servo patterns.

16. A method for controlling a tape head to write to data tracks on a tape medium between servo patterns, wherein the tape head comprises servo readers with a plurality of data writers between the servo readers, comprising:

rotating the tape head at a nominal skew with respect to the tape medium to position the servo readers in the servo patterns, wherein the data writers are located in a first plane of the tape head and the servo readers are located in a second plane in the tape head, wherein the first and the second planes are separated by a distance;

repeatedly determining a skew angle, comprising the nominal skew adjusted by a delta angle, at which to rotate the tape head to position the servo readers in the servo patterns;

repeatedly determining a lateral position error based on the distance and the delta angle; and repeatedly adjusting a lateral position of the tape head using the lateral position error to position the data writers in target data track locations at which to write data.

17. The method of claim 16, wherein the determining the skew angle comprises:

determining the skew angle to eliminate tape width variances in the tape medium measured with the servo patterns; and generating a current to control a skew actuator to rotate the tape head to the skew angle.

18. The method of claim 16, wherein the lateral position of the tape head is adjusted in a negative lateral direction to position the servo readers when the delta angle is positive, and wherein the lateral position of the tape head is adjusted in a positive lateral direction to position the servo readers when the delta angle is negative.

19. The method of claim 16, wherein a tape dimensional stability (TDS) control system calculates the skew angle and a track-following control system calculates the lateral position error when the tape head is rotated at the skew angle, further comprising:

combining, by the track-following control system, a reference lateral position of the tape head with the lateral position error to produce a position error signal to input to a controller to determine an actuator current; and applying, by the track-following control system, the actuator current to the actuator to move the tape head to a lateral position.

20. The method of claim 19, further comprising:

determining, by the TDS control system, a servo band delta from a lateral distance between the servo readers comprising a measured TDS; and feeding back, by the TDS control system, the measured TDS to the TDS control system to recalculate the skew angle.

* * * * *